United States Patent [19]
Barenthsen

[11] Patent Number: 4,991,661
[45] Date of Patent: Feb. 12, 1991

[54] LOCK-UP MOUNT APPARATUS FOR AN EARTH WORKING TILLAGE TOOL

[75] Inventor: Roger S. Barenthsen, West Fargo, N. Dak.

[73] Assignee: Alloway Manufacturing, Fargo, N. Dak.

[21] Appl. No.: 513,069

[22] Filed: Apr. 23, 1990

[51] Int. Cl.⁵ .................. A01B 19/10; A01B 73/00; A01B 39/28
[52] U.S. Cl. .................. 172/662; 172/763; 172/707
[58] Field of Search .............. 172/734, 739, 740, 763, 172/707, 708, 142, 662, 659, 762

[56] References Cited

U.S. PATENT DOCUMENTS

| | | | |
|---|---|---|---|
| 361,792 | 4/1887 | Sweet | 172/707 X |
| 430,841 | 6/1890 | Dorchester | 172/740 X |
| 468,446 | 2/1892 | Brooks | 172/739 |
| 621,954 | 3/1899 | Young | 172/707 X |
| 3,792,736 | 2/1974 | Gondeiro | 172/751 |
| 4,032,245 | 6/1977 | Woodruff | 172/385 |
| 4,079,789 | 3/1978 | Byrd et al. | 172/254 |
| 4,178,999 | 12/1979 | Hansen | 172/702 |
| 4,333,536 | 6/1982 | Ryan | 172/721 |
| 4,799,555 | 1/1989 | Badger | 172/751 |

FOREIGN PATENT DOCUMENTS 437136 11/1926 Fed. Rep. of Germany ...... 172/734

OTHER PUBLICATIONS 4-page brochure (copy) entitlted Precision Cultivator-Alloway Rau.

6-page brochure (copy) entitlted Rowcrop Cultivator-Alloway Rau.

*Primary Examiner*—Randolph A. Reese
*Assistant Examiner*—Spencer Warnick
*Attorney, Agent, or Firm*—Henderson & Sturm

[57] ABSTRACT

A lock-up mount apparatus for an earth working tillage tool includes a bracket which is provided for attachment to a toolbar and the bracket has a first, second, third and fourth pin opening therein. A tillage tool, such as a cultivating tine, has an attachment structure at the top thereof and this attachment structure has a first and second hole disposed therethrough. A first pin is provided for selectively extending through the first pin opening in the bracket and through the first hole in the attachment structure whereby the attachment and thereby the tillage tool is pivotally attached to the bracket. A second pin is provided for selectively extending through one of the second and third pin openings in the bracket. The second pin also extends through a second hole in the attachment structure when the second pin is disposed in the second pin opening in the bracket whereby the tillage tool is held in a low operative earth working position. The tillage tool is held up in an intermediate non-earth working position when the second pin is disposed in the third opening in the bracket. When the first pin is disposed through the fourth pin opening in the bracket and through the first hole in the attachment structure, and the second pin extends through the first opening in the bracket, the tine is held in a high non-working storage position.

3 Claims, 3 Drawing Sheets

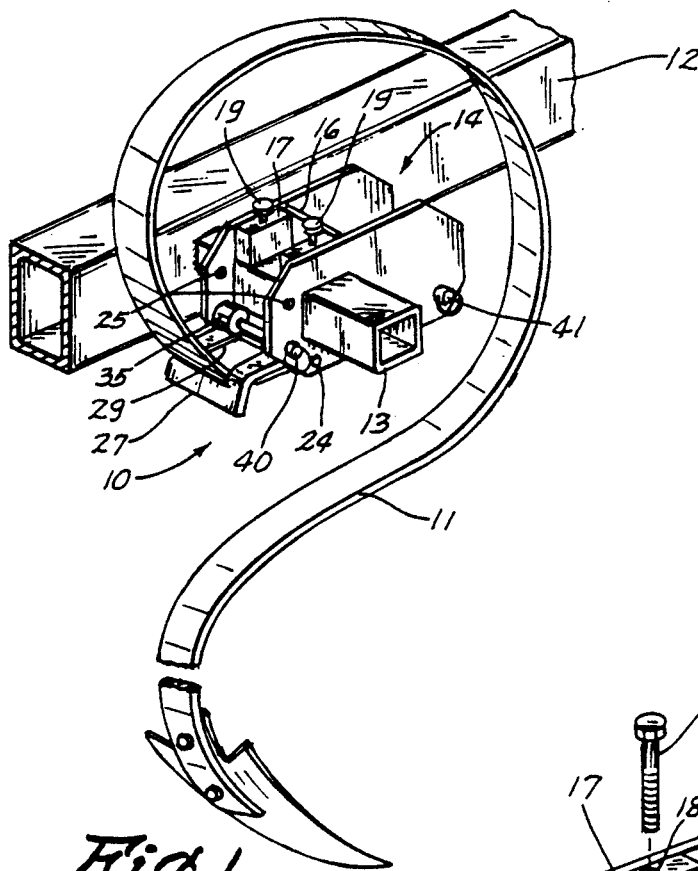
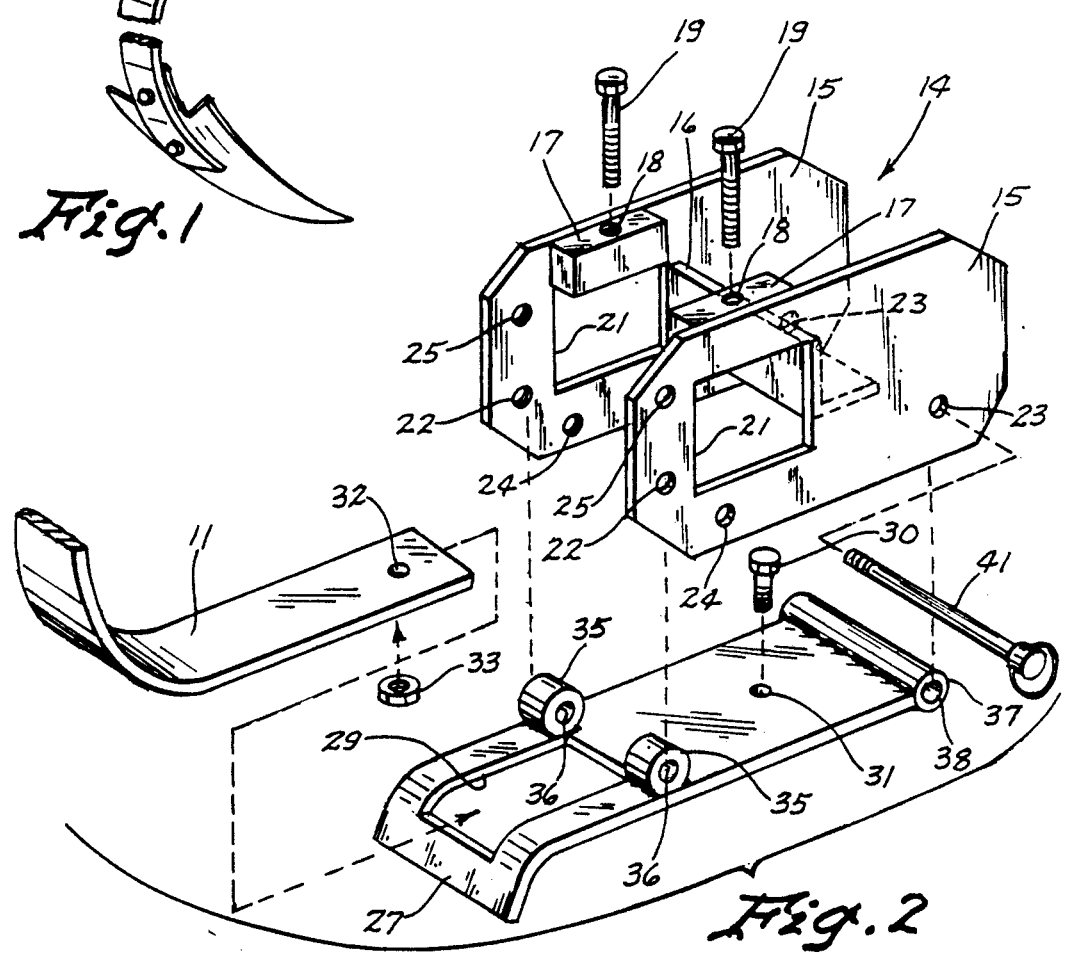
Fig.1
Fig.2

LOCK-UP MOUNT APPARATUS FOR AN EARTH WORKING TILLAGE TOOL

TECHNICAL FIELD

The present invention relates generally to an apparatus for attaching an earth working tillage tool to a toolbar and more particularly to such an apparatus for permitting the tool to be easily and quickly moved among three positions, namely a working position, a non-working position and a non-working storage position.

BACKGROUND ART

In many row crop cultivators, several tines are used to till the soil between the rows of crops for loosening the soil and killing weeds between the rows.

During the early cultivating season when the row crops are small, normally all of the tines are down and in working position to loosen the soil, kill the weeds and to some extent, move the soil and throw it out of the area between the rows and toward the plants themselves. In the middle of the season as the plants get larger, it is sometimes necessary, or at least desirable, to cultivate with just the centermost tine and to remove the other tines. One of the problems with such an arrangement is that the crops vary from field to field and to some extent even within a specific field, so that in certain places it may be desirable to have more of the outside tines present and in working position. In other fields or in other parts of a field, it may be desirable to remove such tines. Of course when the tines are removed, it is time consuming to put them back on. During the middle of the season, the operator usually does not want to throw too much dirt against the plant row, and that is one reason why the outer tines of the cultivator need to be removed during this cultivating process in the middle of the growing season.

Later on in the season, when the crops are much larger, it is more often desirable to remove the outer tines for each row. When this is done, it is very easy to misplace the tines and not have them accessible when they are needed.

Consequently, there is a need for an apparatus to solve the aforementioned problems with the prior art.

DISCLOSURE OF THE INVENTION

The present invention relates generally to a lock-up mount apparatus for an earth working tillage tool. A bracket is provided for attachment to a toolbar and the bracket has a first, second, third and fourth pin opening therein. A tillage tool, such as a cultivating tine, has an attachment structure at the top thereof and this attachment structure has a first and second hole disposed therethrough. A first pin is provided for selectively extending through the first pin opening in the bracket and through the first hole in the attachment structure whereby the attachment and thereby the tillage tool is pivotally attached to the bracket.

A second pin is provided for selectively extending through one of the second and third pin openings in the bracket. The second pin also extends through a second hole in the attachment structure when the second pin is disposed in the second pin opening in the bracket, whereby the tillage tool is held in a low operative earth working position. The tillage tool is held up in an intermediate non-earth working position when the second pin is disposed in the third opening in the bracket. When the first pin is disposed through the fourth pin opening in the bracket and through the first hole in the attachment structure and the second pin extends through the first opening in the bracket, the tine is held in a high non-working storage position.

An object of the present invention is to provide an improved mounting apparatus for an earth working tillage tool.

Another object of the present invention is to provide a lock-up mount apparatus for selectively moving an earth working tillage tool between an earth working position and a non-earth working position.

A further object of the present invention is to provide a lock-up mount apparatus for an earth working tillage tool for easily and quickly moving an earth working tine among three positions, specifically a lowered earth working position, an intermediate non-working position and a high non-working storage position.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a portion of a row crop cultivator having the present invention attached thereto;

FIG. 2 is an enlarged exploded view of the apparatus of the present invention;

BEST MODE FOR CARRYING OUT THE INVENTION

Figure 3:
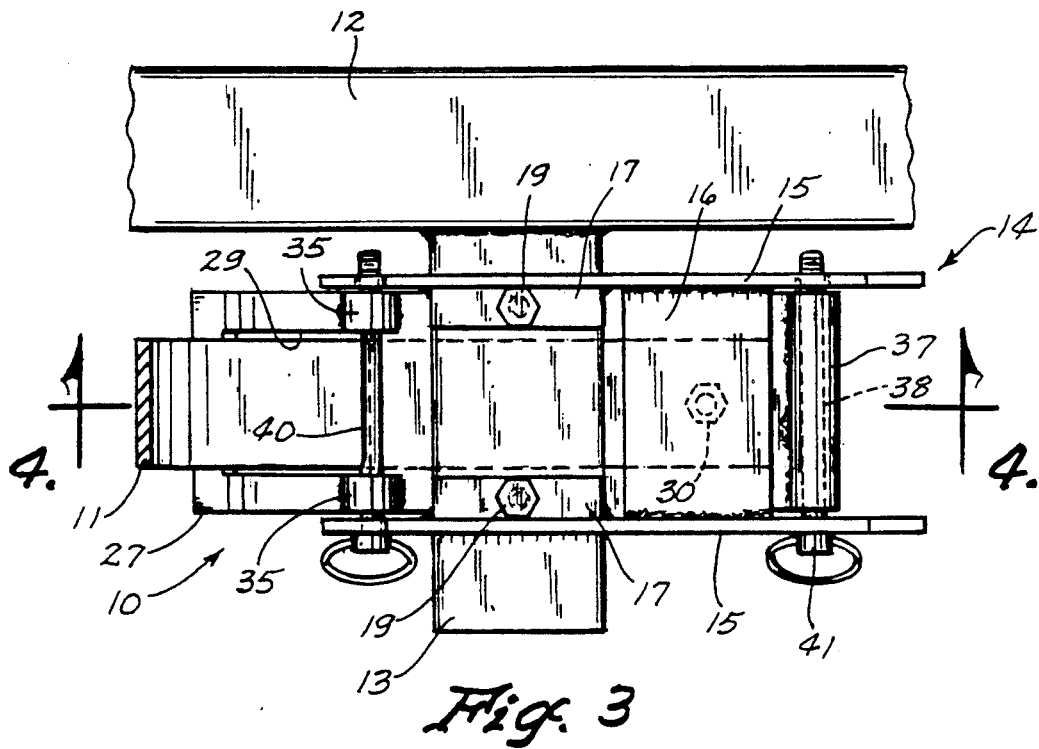
FIG. 3 is a top view of the apparatus showing the working tine locked in a working position.
Figure 4:
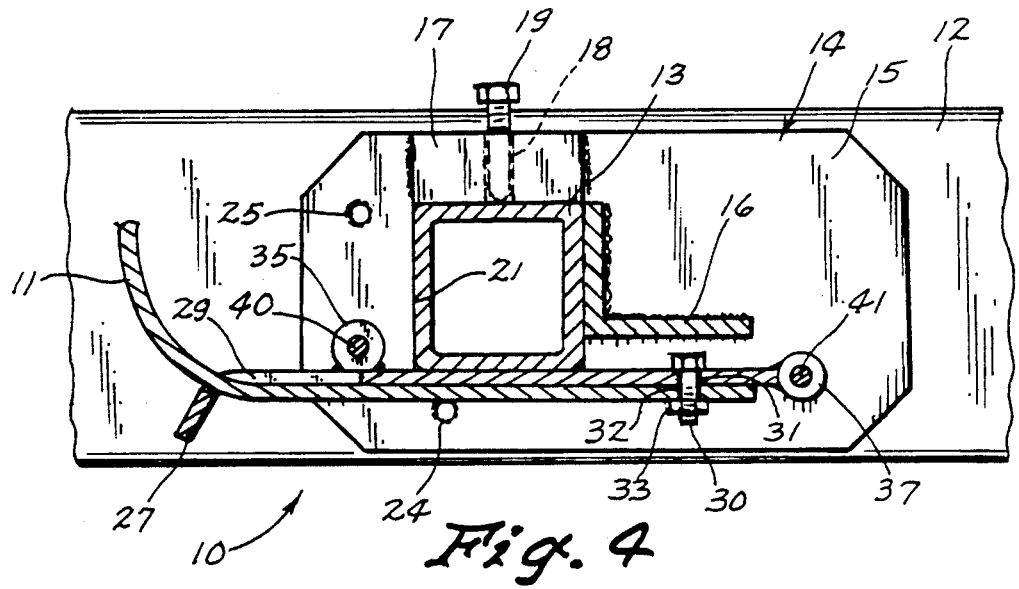
FIG. 4 is a cross sectional view taken along line 4—4 of FIG. 3.
Figure 5:
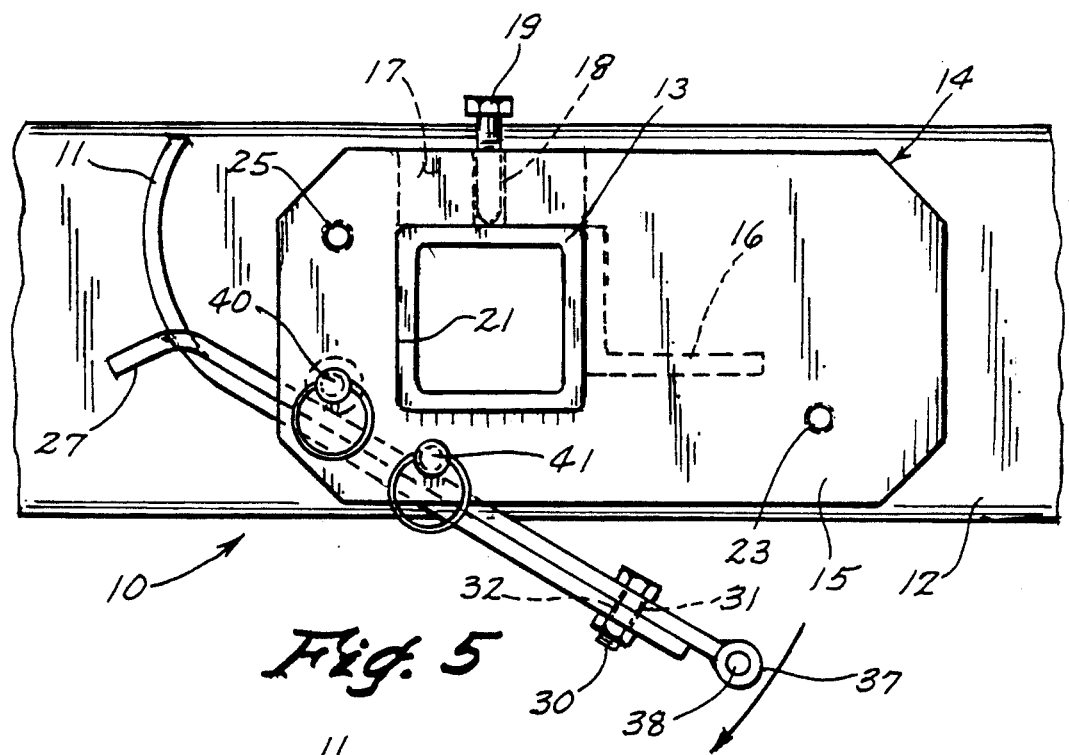
FIG. 5 is an enlarged side view showing the working tine moved to a non-working position by merely moving one pin, pivoting the tine upwardly and inserting the pin in another place.
Figure 6:
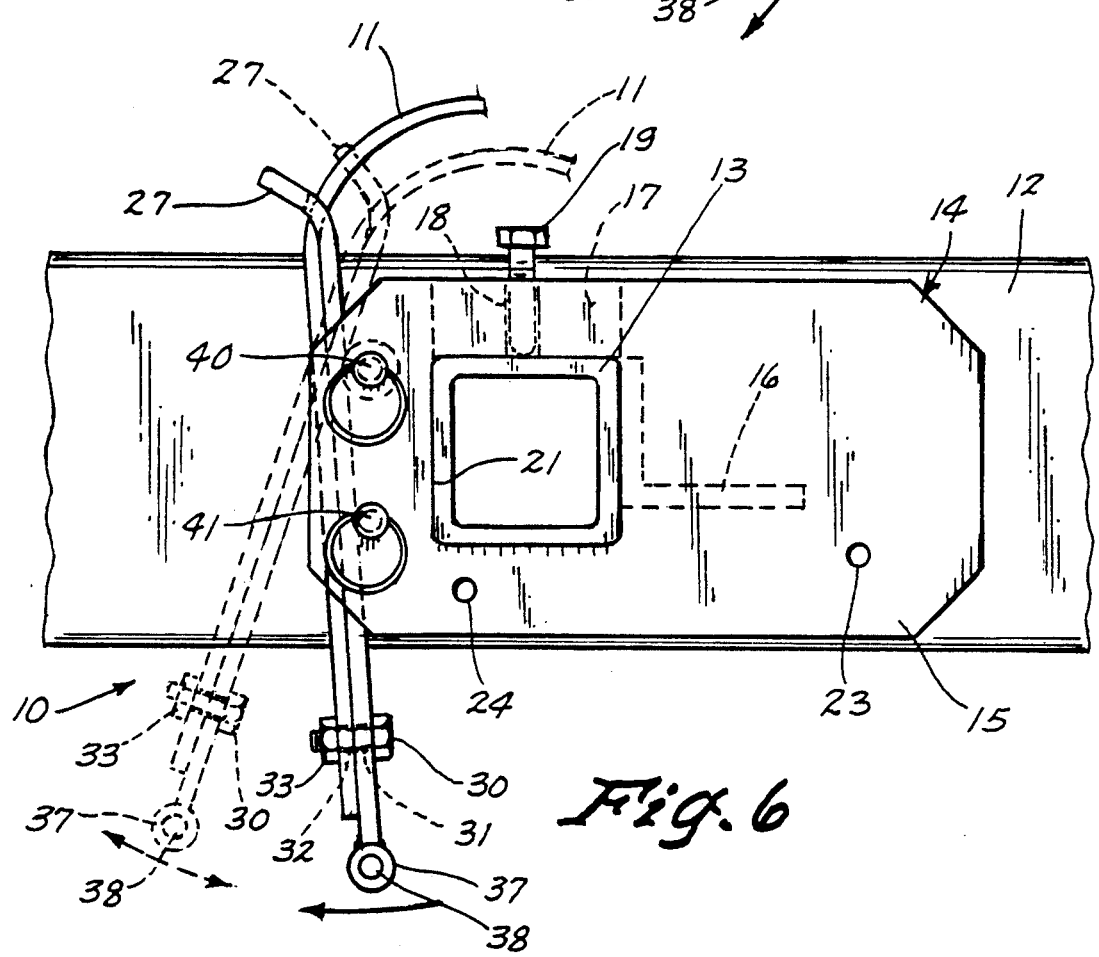
FIG. 6 is a side elevational view like FIG. 5 but showing the earth working tool moved to a non-working storage position by movement of the tine and connecting pins.

Referring now to the drawings wherein like reference numerals designate identical or corresponding parts throughout the several views, FIG. 1 shows a lock-up mount apparatus (10) constructed in accordance with the present invention for holding an earth working tine (11) in the working position shown in FIG. 1 or in one of two other positions shown in FIGS. 5 and 6.

The structural member (12) is typically attached to a main toolbar which extends transversely to the direction of travel of such cultivator implement and the structural member (12) is generally pivotally attached to such main toolbar in such a way that it can raise or lower to be the proper distance above the ground. This structural member (12) is generally in alignment with the forward direction of travel of the cultivator apparatus.

Typically, the member (12) has an earth working tine (11) on the extreme rear end thereof and two or more sub-toolbar members (13) are welded thereto which extend generally in a parallel relationship to the main toolbar (not shown) for mounting additional tines (11) thereto as is shown in FIG. 1. The sub-toolbar (13) has a bracket (14) disposed thereon as can best be seen in FIGS. 1 and 2. This bracket (14) includes a pair of flanges (15) welded to a center portion (16). Metal blocks (17) are rigidly attached to the side plates (15) and have an internally threaded bore (18) therein for reception of a set screw or bolt (19).

The side plates (15) have a toolbar opening (21) therein and a plurality of first, second, third and fourth pin openings (22), (23), (24) and (25) respectively.

An attachment plate (27) is attached to one end of the earth working tine (11) by placing one end thereof through a slot (29) and then using a bolt (30) which passes through hole (31) in attachment plate (27), through a hole (32) in the tine (11) and has a threaded nut (33) which selectively threadably engages the bolt (30) to securely hold the tine (11) in place with respect to the attachment plate (27).

Tubes (35) are rigidly attached to the attachment plate (27) and have holes (36) therein. A tube (37) is also welded to one end of the attachment plate (27) and has a hole (38) disposed therethrough. A first pin (40) is provided for extending through aligned holes and openings in the bracket (14) and attachment plate (27) and a second pin (41) is provided for extending through other openings in the bracket (14) and holes in the attachment plate (27).

In operation, when it is desired to utilize the apparatus (10), the set screws (19) are loosened and the bracket (14) is slid over the set toolbar (13) through openings (21) in plates (15), for example as shown in FIG. 1. The set screws (19) are then tightened down against the sub-toolbar (13) to hold the bracket (14) securely in place in the position shown in FIG. 1. To place the cultivator tine (11) in the working position shown in FIG. 1, the pin (40) is placed through the first openings (22) in the plates (15) and through the holes (36) in tubes (35). The tine (11) and attachment plate (27) is then pivoted to align the hole (38) in attachment plate (27) with the second openings (23) in the bracket (14).

If too much dirt is being thrown against the row crop, or if for any other reason it is desired to move the working tine (11) from the working position shown in FIG. 1 to a non-working position, the tine (11) can quickly be moved from the position shown in FIG. 1 to the position shown in FIG. 5 by merely removing the second pin (41) from where it is shown in FIGS. 1–4 and then pivoting the attachment member (27) and tine (11) along the direction of the arrow shown in FIG. 5 until it is below the third opening (24) in the bracket (14). Then the pin (41) is inserted through the openings (24) and, because most of the weight of the tine (11) is on the other end from the pivot pin (40), the tine bracket (27) will, by gravity, pivot back toward the second pin (41), and by this arrangement be generally held in that position and up out of the working position thereof. Of course if it is desired to again return the tine (11) to the working position shown in FIG. 1, a reverse procedure is utilized to again achieve the arrangement of holes, pins and openings shown in FIGS. 1–4.

In certain instances, the non-working position in FIG. 5 will cause the working end of the tine (11) to come in contact with the leaves of the plant and this may be an undesirable situation as the plants become larger and larger during the growing season. Consequently, it may be desirable to move the tine (11) and attachment plate (27) to the position shown in FIG. 6. In the prior art, the tine was removed when not needed, for example, later on in the growing season when the plants are larger, but it was determined from experience that sometimes the tines were not kept track of and were thereby misplaced, left in the machine shed, or back at the previous field that was cultivated. Consequently, the non-working storage position of FIG. 6 provides a way for the operator to store the tine but keep it with the machine so that it will be there when it is needed.

In order to move the tine (11) from the position shown in either FIGS. 1–4 or 5, the pin (40) is removed from the first opening (22) and the holes (36) and the tine is physically moved upwardly to align the fourth openings (25) with the first hole (36) in the attachment plate (37). The first pin (40) is then placed through the fourth pin openings (25) and the first hole (36) so as to pivotally attach the attachment plate (27) and the tine (11) to the bracket (14). The tine (11) and bracket plate (27) are then pivoted to the position shown in dashed lines in FIG. 6 and the second pin (41) is extended through the first openings (22). When the operator releases the tine (11), it will move back from the position shown in dashed lines to the position shown in solid lines because of the gravitational forces and the fact that the other end of the tine is much heavier and will generally cause the tine to pivot in such direction. The tine (11) will therefore remain in this non-working storage position until the time that it is again needed, at which time the pins (40) and (41) can be removed and the arrangement shown in FIGS. 1–4 can be achieved again very quickly and easily.

Accordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

What is claimed is:

1. A lock up mount apparatus for an earth working tillage tool comprising:

a bracket having a toolbar opening disposed therein along a first generally horizontal axis, said toolbar opening being adapted to receive a toolbar in said toolbar opening, a first pin opening in said bracket, a second pin opening in said bracket and a third pin opening in said bracket;

a tillage tool means having one end for engagement with ground to be worked;

attachment means disposed on the other end of said tillage tool means, said attachment means having a first hole disposed therein and a second hole disposed therein;

first pin means for selectively extending through said first pin opening in said bracket and said first hole in said attachment means whereby said attachment means and thereby said tillage tool means if pivotally attached to said bracket;

second pin means for selectively extending through one of said second and third pin openings, said second pin means also extending through said second hole in said attachment means when said pin means is disposed in said second pin opening in said bracket whereby said tillage tool means is held in an operative earth working position and said tillage tool means is held up in a non-earth working position when said second pin means is disposed in said third pin opening in said bracket; and a fourth pin opening in said bracket for selectively receiving said first pin means therethrough and through the first hole in said attachment means and having said second pin means extending through said first opening.

2. The apparatus of claim 1 including means for permitting said tillage tool means to pivot about said first pin means and toward said second pin means when said second pin means is disposed in said third pin opening, whereby said tillage tool will be held up in the non-earth working position.

3. The apparatus of claim 1 including means for causing said tillage tool means to pivot about said first pin means and toward said second pin means when said first pin means is in said fourth pin opening and said second pin means is in said first opening whereby said tillage tool is held in a storage position.

* * * * *